(12) United States Patent
Cha

(10) Patent No.: US 6,382,415 B1
(45) Date of Patent: May 7, 2002

(54) TRAY AND A CASE FOR RECEIVING A CIRCULAR DATA STORAGE DISK

(75) Inventor: Philippe Cha, Iffendic (FR)

(73) Assignee: La Francaise des Plastiques, Lou Vigne-de-Bais (FR)

( * ) Notice: Subject to any disclaimer, the term of this patent is extended or adjusted under 35 U.S.C. 154(b) by 0 days.

(21) Appl. No.: 09/786,251

(22) PCT Filed: Aug. 27, 1999

(86) PCT No.: PCT/FR99/02050

§ 371 Date: Mar. 2, 2001

§ 102(e) Date: Mar. 2, 2001

(87) PCT Pub. No.: WO00/14745

PCT Pub. Date: Mar. 16, 2000

(30) Foreign Application Priority Data

Sep. 4, 1998 (FR) ............................................. 98 11225

(51) Int. Cl.[7] .................................................. B65D 85/57
(52) U.S. Cl. ..................................... 206/310; 206/308.1
(58) Field of Search ............................. 206/308.1, 309, 206/310, 493, 303

(56) References Cited

U.S. PATENT DOCUMENTS

| | | | | |
|---|---|---|---|---|
| 4,903,829 A | | 2/1990 | Clemens | |
| 5,244,085 A | * | 9/1993 | Lammerant et al. | 206/310 |
| 5,383,553 A | | 1/1995 | Lammerant et al. | |
| 5,494,156 A | * | 2/1996 | Nies | 206/310 |
| 5,515,968 A | * | 5/1996 | Taniyama | 206/310 |
| 5,660,274 A | * | 8/1997 | Chien | 206/308.1 |
| 5,727,680 A | * | 3/1998 | Liu | 206/308.1 |
| 5,746,315 A | * | 5/1998 | Luckow | 206/310 |
| 5,950,822 A | * | 9/1999 | CLoran et al. | 206/310 |

FOREIGN PATENT DOCUMENTS

| DE | 19505230 C1 | 6/1996 |
|---|---|---|
| GB | 2243145 A | 10/1991 |

* cited by examiner

Primary Examiner—Luan K. Bui
(74) Attorney, Agent, or Firm—Perman & Green, LLP

(57) ABSTRACT

The invention concerns tray for receiving at least a circular data storage disk having a central orifice, comprising in its center wall elements (5; 6) inscribed in a circle, designed to penetrate into the disk central orifice for maintaining it. Said tray is characterised in that said wall elements comprise rigid elements (5) for pressing against the disk central orifice, and flexible elements (6) in the form of elastically deformable fingers, capable of preventing the disk form being released in an axial direction, without coming into contact with the rim of its central orifice.

11 Claims, 4 Drawing Sheets

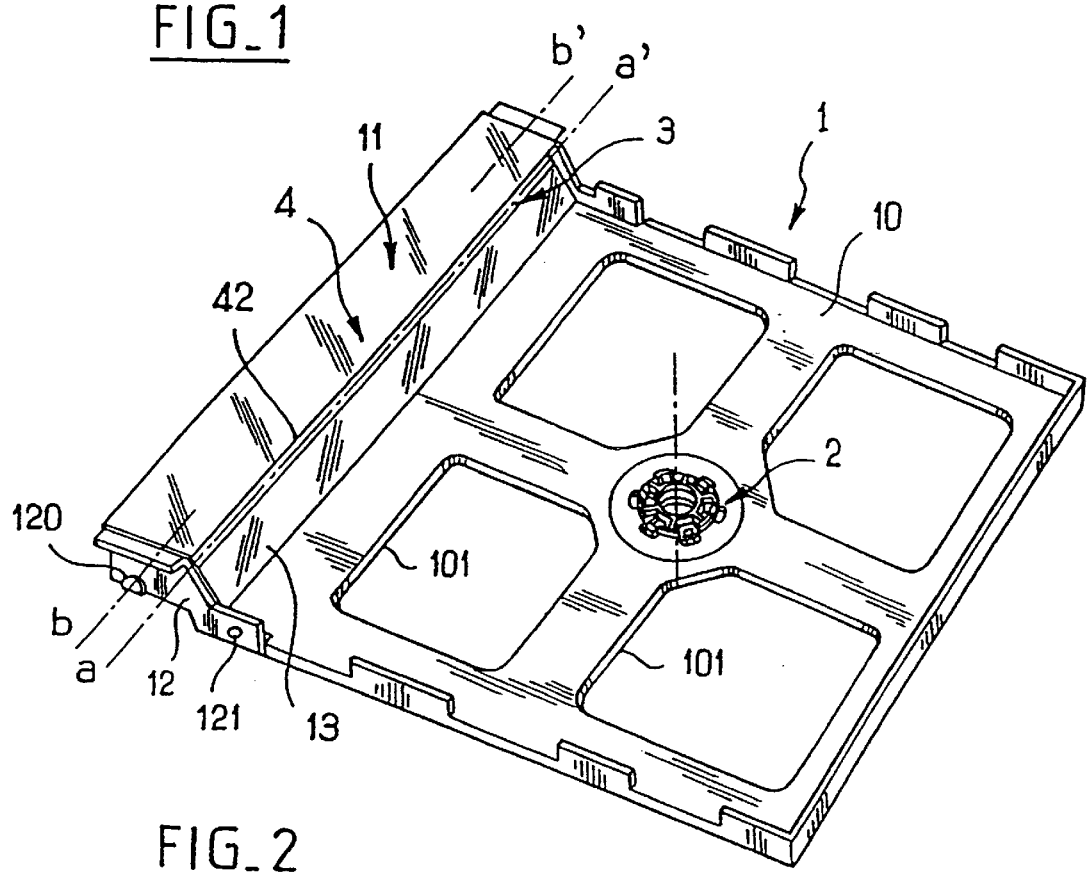
FIG_1
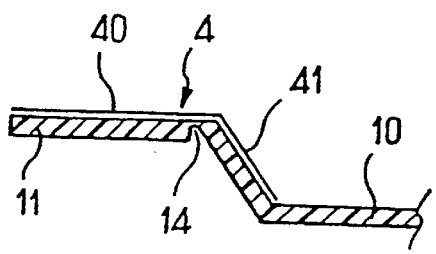
FIG_2
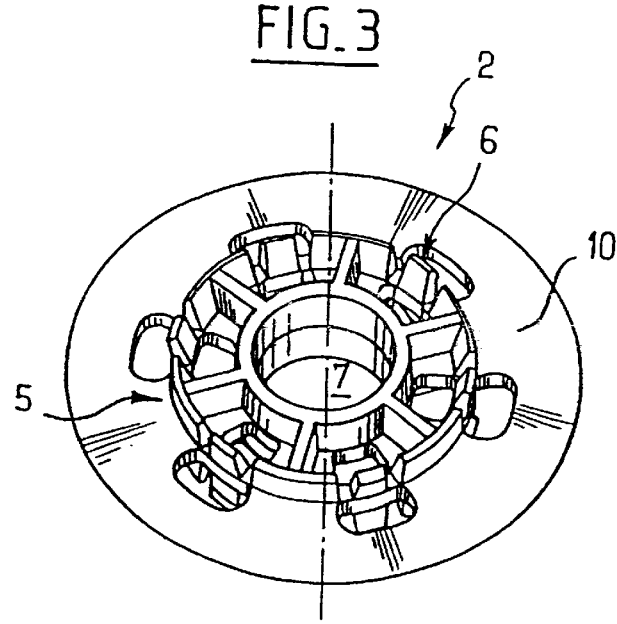
FIG_3

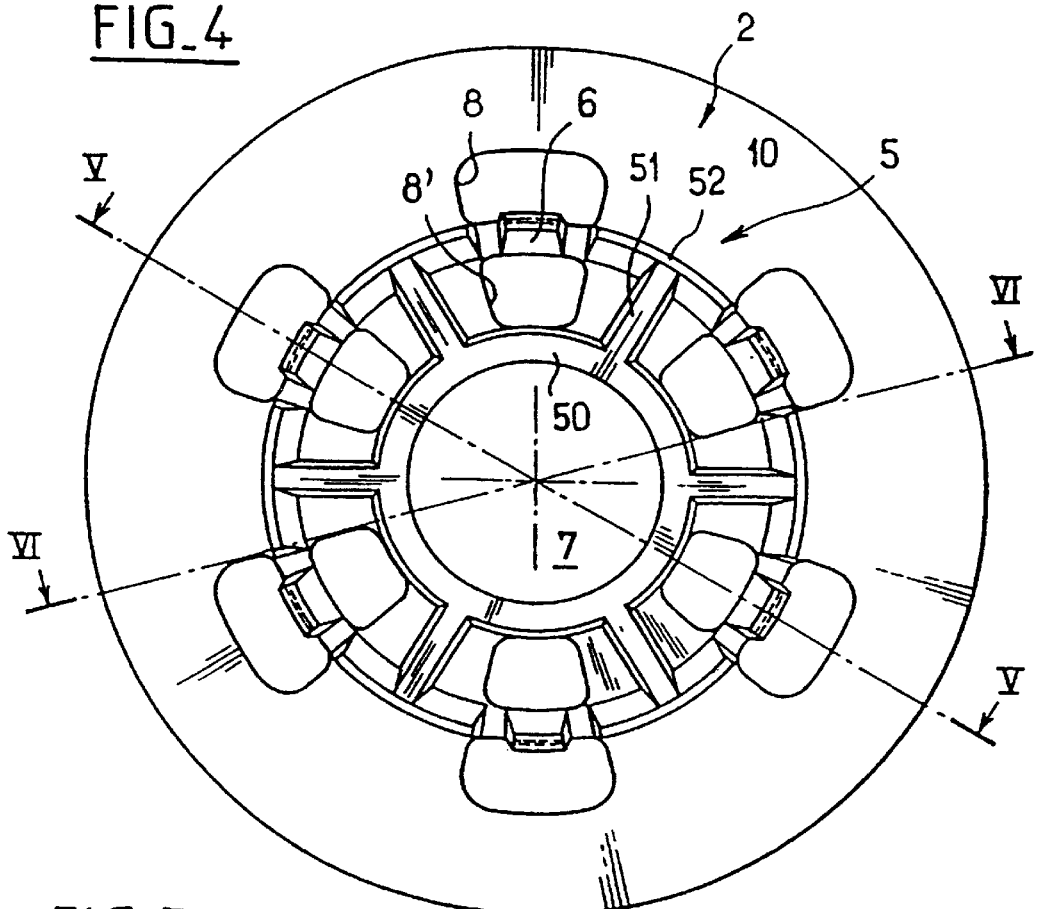
FIG_4
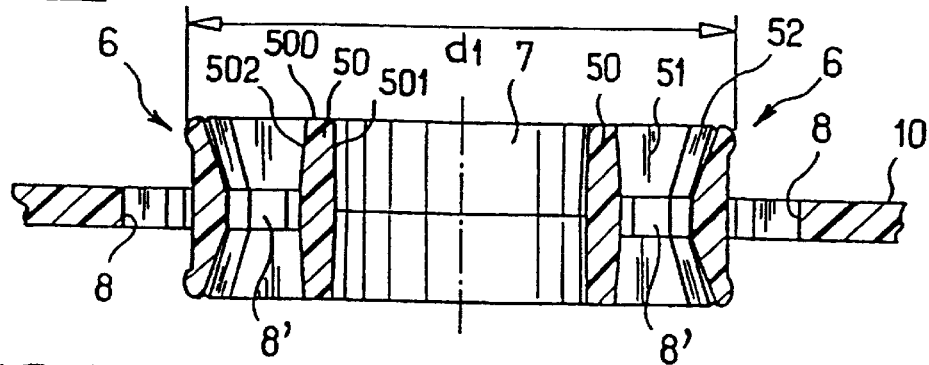
FIG_5
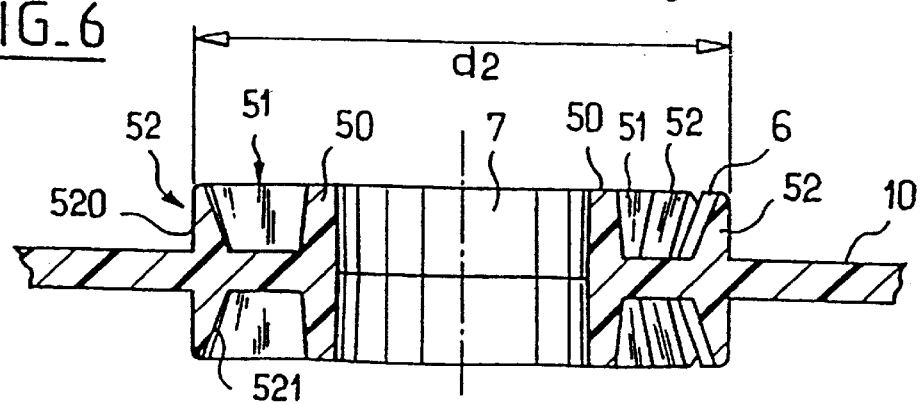
FIG_6

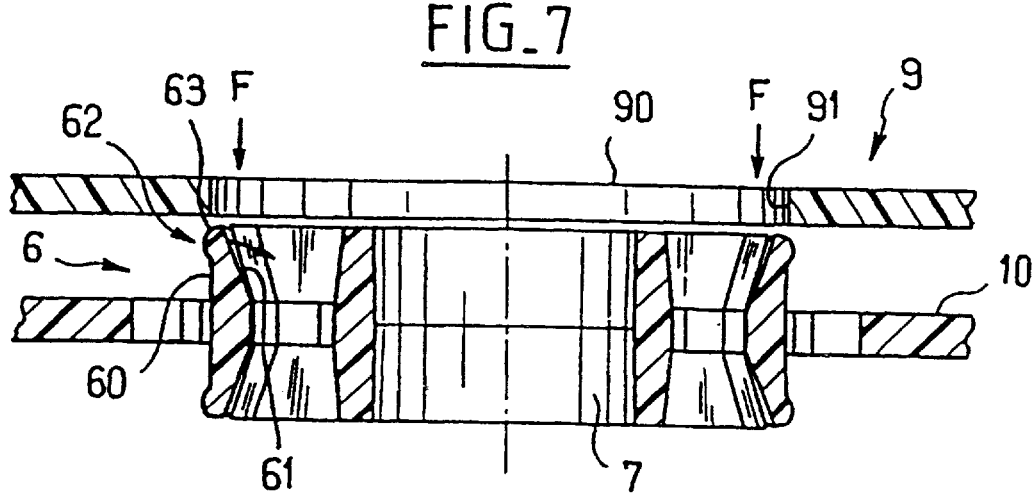
FIG_7
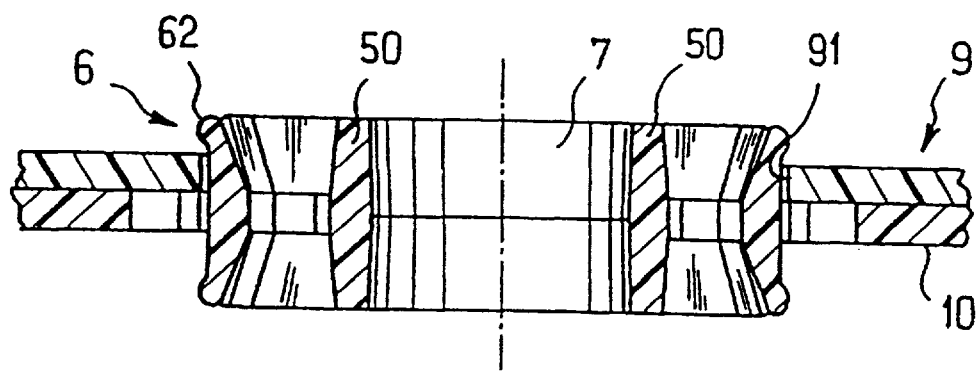
FIG_8
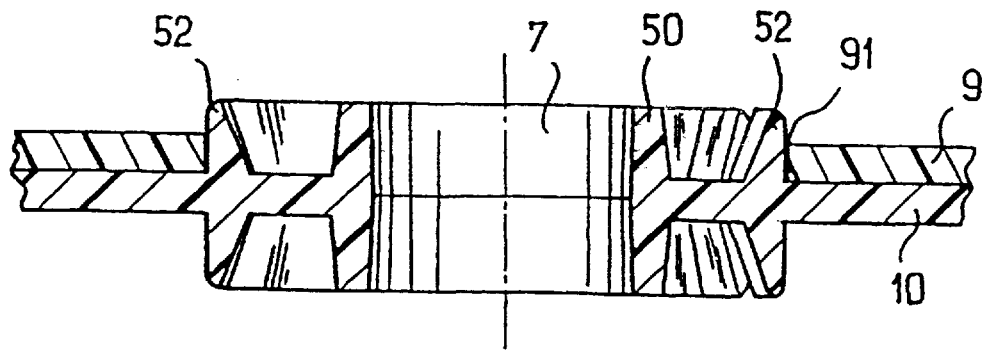
FIG_9

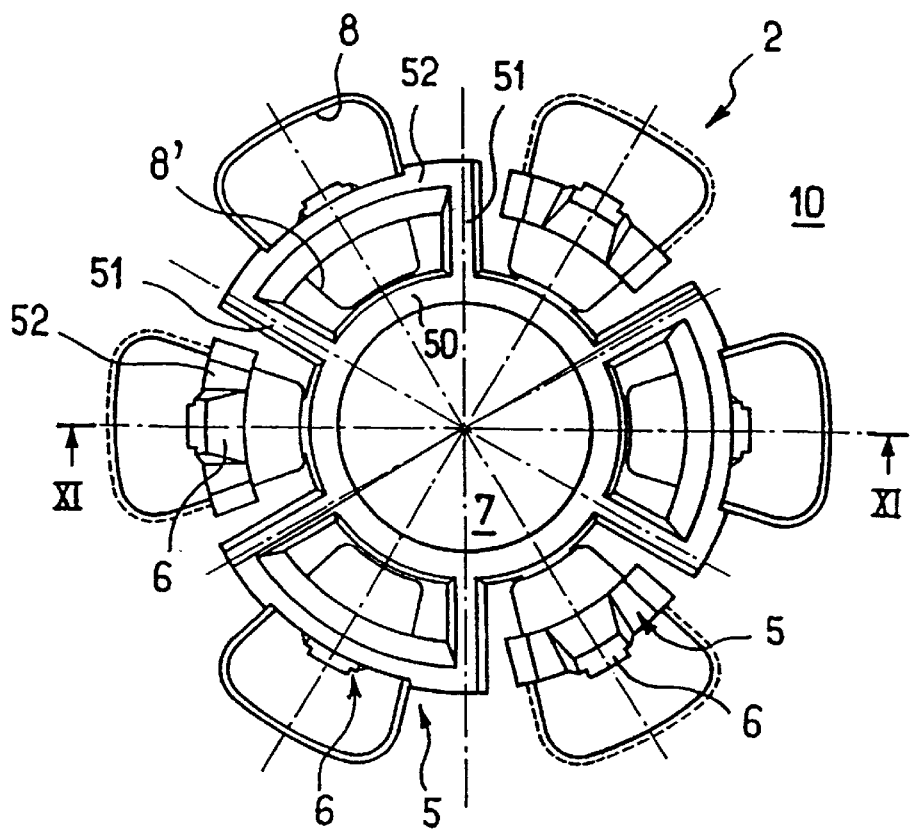
FIG_10
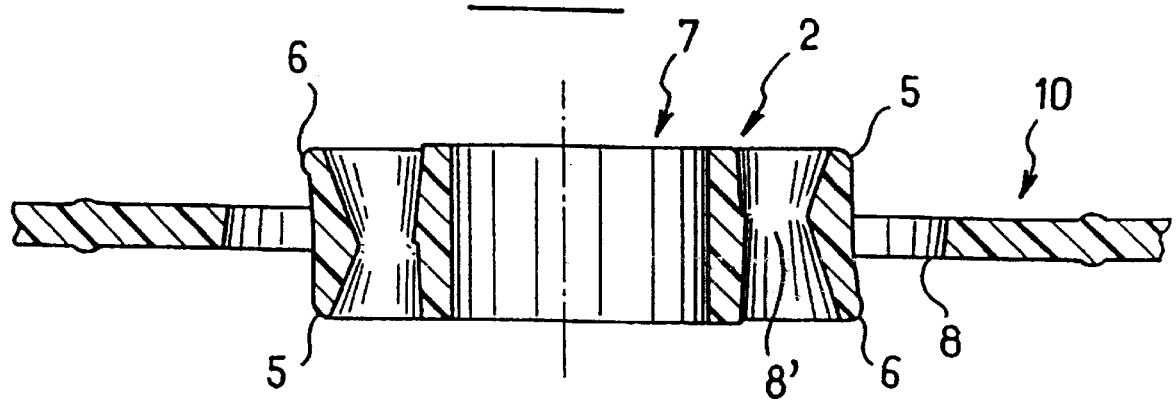
FIG_11

TRAY AND A CASE FOR RECEIVING A CIRCULAR DATA STORAGE DISK

The present invention relates to a tray for receiving at least one circular data storage disk that presents a central opening.

It also relates to a case for storing such a disk.

The term "data storage disk" is used to mean a magnetic and/or high density optical data disk such as a compact disk (a digital audio disk), a "CD-ROM", etc. Naturally, it applies equally well to a blank disk that has yet to receive any data as to a disk on which data is already recorded.

Traditional compact disk cases essentially comprise two elements, namely a bottom and a lid, which are hinged to each other by means of a hinge.

That type of case has a tray mounted therein for receiving at least one disk.

When the tray is to receive a single disk only, then it is engaged against the bottom of the case and it is normally designed not to be dismountable.

When it is designed to receive two disks, i.e. one disk against each of its faces, then it is hinged to the bottom of the case. This makes it possible to tilt the tray so as to access one or other of the disks.

The tray conventionally has wall elements occupying a circle on one or both faces, which elements are designed to penetrate into the central opening of the disk in order to hold it in place. This set of elements can be referred to as a "hub".

Thus, document DE-C-195 05 230 describes a receiver tray having a central ring from which disk-fixing elements extend radially.

Those elements consist in T-shaped pieces with the base of each piece being fixed to the ring and lying in the plane of the tray. The "crossbar" is constituted by two identical parts referred to as clamping portions. It is said that those portions are formed integrally with the base and extend outside the plane of the tray so as to clamp each of the disks in full. It is also stated, with reference to FIG. 7, that each part is terminated by a hook so as to increase the clamping effect.

Protective tabs extend radially from each side of the fixing elements. It is stated that these tabs terminate in front of parts of the fixing elements. It thus appears that the disks are locked solely by the fixing elements.

Document GB-A-2 243 145 describes a laser disk case having disk-retaining elements on one wall. These elements are constituted by curved walls between which "hooks" are interposed, which hooks together define a portion of a cylinder. It is stated that the cylinder portion is adapted to be received in the central opening of the disk, the outside diameter of the arcuate walls being equal to the diameter of the opening in the disk.

When the case is closed, fingers provided on the second wall bear against the hooks so as to cause them to be pressed against the rim of the disk opening.

Other trays have rigid first elements and flexible second elements. The rigid elements are constituted by thick wall elements integral with the tray and they are generally distributed in a star around a central hole.

Their function is to protect the flexible elements while a disk is being put into place on the tray.

The flexible elements are generally in the form of thin resilient fingers that are radially deformable and regularly distributed around the above-mentioned notional circle.

To improve resilient deformation of the fingers, large cutouts are generally provided in the tray itself at the base of the fingers.

Their function is to center and hold the disk against the tray by resilient snap-fastening.

In the rest position, i.e. so long as a disk is not engaged on the tray, the distance between the outer edges of two diametrically opposite fingers, as measured between their free top ends, is greater than the diameter of the central opening in the disk.

Nevertheless, by moving the disk axially against the hub, i.e. in a direction perpendicular to the plane of the tray, the fingers are forced to deform radially towards the center of the tray so as to allow the disk to engage on the hub.

Once that operation has been performed, the fingers return to their initial positions.

This leads to a situation in which the free top ends of the fingers oppose disengagement, i.e. withdrawal, of the disk in an axial direction so long as the bases of the fingers secured to the tray bear (press) against the edge of the central opening of the disk.

As specified above, the fingers thus have two functions. The first function is to center the disk while it is being put into place on the hub. The second is to retain the disk against the tray.

At present, attempts are being made to provide trays which withstand a so-called "drop-test". The drop-test consists in allowing a tray having one or two disks fitted thereto to fall through a height of 80 centimeters (cm) onto the floor, with the plane of the tray extending vertically.

A tray that withstands the drop-test is a tray whose hub elements are not damaged or broken as a result of such a fall, with the disk(s) remaining properly held in place and being undamaged.

With trays of the kind described above, the flexible elements are often found to break since the disk cuts through them as a result of the fall.

This is explained by the fact that the flexible elements are fragile and bear directly against the edge of the opening of the disk. In other words they press against the disk.

The main consequence of that state of affairs is that the disk separates from the tray and runs the risk of breaking.

An object of the present invention is to remedy those drawbacks.

In other words, the invention seeks to propose a receiver tray that can withstand the drop-test, i.e. a tray having hub elements that remain intact and continue to hold the disk even in the event of an accidental fall.

As mentioned below, this object is achieved by means that are simple and low in cost.

The present invention thus provides a tray for receiving at least one circular data storage disk having a central opening, the tray having wall elements in its center that are inscribed within a circle and designed to penetrate into the central opening of the disk in order to retain the disk.

The tray is remarkable by the fact that said wall elements comprise rigid elements suitable for bearing against the edge of the central opening of the disk, and flexible elements in the form of elastically deformable fingers suitable for opposing removal of the disk in an axial direction, without bearing against the edge of its central opening.

The diametral spacing between two rigid elements is greater than the diametral spacing between the bases of two flexible elements.

In this way, the flexible elements perform a single function, that of opposing removal of the disk in an axial direction.

The disk is held in the plane parallel to the tray by the rigid elements. These are thick so there is no danger of them breaking when the tray is dropped. The tray thus withstands the drop-test.

According to other characteristics of the invention that are advantageous but not limiting:

each of said rigid elements comprises a radial branch and an arcuate crossbar suitable for bearing against the edge of the central opening of the disk;

said flexible elements present respective enlarged top portions giving them a generally hooked shape;

the top portion is chamfered so as to facilitate retraction of said elements by elastic deformation while the disk is being engaged;

said rigid elements and said flexible elements are distributed in alternating manner;

the tray has wall elements on both faces so as to suitable for receiving two disks;

the wall elements on one face extend the wall elements on the other face;

the wall elements on one face are distributed in alternating manner relative to the elements of the other face;

the arcuate crossbars of two adjacent rigid elements meet and carry a flexible element which projects towards the second face through an opening; and the tray is provided with a support strip to which it is hinged via at least one hinge, said hinge being constituted solely by the free intermediate zone of a flexible sheet overmolded on said tray and said strip.

The invention also provides a case for storing a circular data storage disk having a central opening, the case comprising a bottom and a lid that are hinged to each other by a hinge. It is characterized by the fact that it includes a tray in accordance with any of the above characteristics and which coincides with said bottom.

Other characteristics and advantages of the invention will appear on reading the following detailed description of embodiments that are preferred, but not limiting.

The description is made with reference to the accompanying drawings, in which:

FIG. 1 is a perspective view of a tray of the present invention;

FIG. 2 is a fragmentary section view of the FIG. 1 tray;

FIG. 3 is a perspective view of the central portion of the tray which includes rigid elements and flexible elements constituting a hub for securing a disk;

FIG. 4 is a plan view on a larger scale of the FIG. 3 hub;

FIGS. 5 and 6 are section views of the FIG. 4 hub respectively on section planes V—V and VI—VI marked in FIG. 4;

FIGS. 7 and 8 are views analogous to FIG. 5 showing how a disk is engaged and retained on the tray;

FIG. 9 is a view analogous to FIG. 6 showing how a disk is retained on the tray;

FIG. 10 is a view analogous to FIG. 4 showing another embodiment of the hub, referred to as a "dual hub"; and FIG. 11 is a section view of the FIG. 10 hub on section plane XI—XI.

A tray 10 of the invention as shown in FIG. 1 includes a support strip 11 to which it is hinged. Together they constitute a receiver assembly 1 for receiving at least one disk and designed to be installed in a case (not shown).

The assembly 10–11 is shaped and dimensioned so as to be suitable for being inserted inside a standard case of the kind initially designed to receive a single compact disk.

The tray and the strip are made of plastics material of the same kind. The tray has a dual central hub 2 as described below.

In conventional manner, the tray has weight-reducing openings 101. In the example shown, these openings are approximately square in shape. In a variant embodiment, they could be circular.

At each of its two ends, the strip 11 has a transverse flange 12 which is provided on the outside with a pair of projections 120, 121.

The projections 120 snap into the edges of holes whose opposite ends receive the stub axles for hinging the lid onto the bottom element of the case, which has a hinge axis that corresponds to the axis referenced bb' in the figure.

The projections 121 snap into other holes provided in the lateral rims of the bottom element of the case.

Still in conventional manner, adjacent to the strip, the tray 10 has a sloping margin 13 which is hinged to the edge of the strip by a hinge 3 of axis aa' parallel to bb'.

This hinge is implemented by means of a flexible sheet 4 which is fixed by overmolding onto each of the elements 10 and 11, these two being distinct pieces.

References 40 and 41 designate zones of the sheet 4 which adhere to the elements 10 and 11 respectively. They are separated by a strip or intermediate free zone 42 that is narrow and that is the only portion constituting the hinge 3.

Naturally, the materials of the sheet 4 and of the elements 10 and 11 must be compatible with molding.

In addition, the sheet 4 must be strong both in traction and in bending.

In the embodiment shown, reference 14 designates an attachment zone or web connecting the margin 13 to the portion 11. This zone is provided in the center (on the middle longitudinal plane of symmetry of the box element) and it is obtained by having a suitable channel present in the mold, thereby enabling the strip 11 to be molded as a single piece with the portion 10.

This makes it easy to handle this undeformable assembly, in particular when putting compact disks into place on the tray 10 by means of an automatic machine, and subsequently when inserting the assembled tray in a case.

The attachment web 14 is breakable, i.e. it presents little strength so it can be torn easily.

Thus, on the first occasion that the tray is pivoted, the web 14 breaks and the portion 10 is then hinged to the strip 11 via the free sheet zone 42.

Naturally, the present invention relates equally well both to a tray of the kind described above as shown in FIG. 1 and to a "conventional" tray, i.e. a tray that is not hinged and that is designed to be permanently fixed against the bottom of the case.

As already mentioned, the tray 10 has a dual hub 2 whose wall elements 5 and 6 are inscribed within a circle.

The term "wall element" is used to mean an element that projects from the plane of the tray and that is integral, i.e. molded therewith.

The term "dual hub" is used to indicate that such elements project from both faces of the tray 10, so as to enable a disk to be placed against each face.

In the description below, the elements 5 and 6 are described relative to one face only, and those corresponding to the other face are identical and symmetrical about the plane of the tray.

The wall elements 5 and 6 are placed around a circular central hole 7 provided through the tray, thus enabling the tray to be indexed on automatic machines for packaging compact disks.

In accordance with the invention, the wall elements have rigid elements 5 which are suitable for bearing against the edge of the central opening of a disk that has been put into place.

More precisely, the means 5 comprise a low annular wall 50 which extends all around the hole 7 and projects upwards, perpendicularly to the tray 10. Its top face 500 is plane and parallel to the tray, while its inner side face 501 adjacent to the hole 7 is perpendicular to said tray. Finally, its second side face, on the outside slopes so that the thickness of the low wall 50 is greater in the plane of the tray 10 than at the top of the wall.

Six tabs 51 extend radially from the low wall 50. They are uniformly distributed around the periphery of the wall and are identical in section thereto. It should be observed that they are integral with the wall.

A crossbar 52 of slightly arcuate shape extends transversely from the end of each tab 51 with the concave side of the crossbar facing towards the center of the tray. The set of crossbars 52 is inscribed in a circle whose center coincides with the center of the hole 7. The outer side face 520 of each crossbar is perpendicular to the plane of the tray, while the inner side face 521 slopes, the crossbar being of thickness that tapers towards its top face.

The tabs 51 and the crossbars 52 in pairs constitute T-shaped elements, with the crossbar being arcuate and suitable for bearing against the central opening of a disk, as described below.

Because the hub is entirely symmetrical, it will be seen that these T-shaped elements face one another in pairs.

In FIG. 6, $d_2$ designates the diametral distance between the outer faces 520 of T-shaped elements. This distance is substantially equal to the diameter of the central opening in a data storage disk such as a compact disk.

Between two adjacent crossbars 52 there extends a finger-shaped flexible element 6. Thus, in the example shown in the figures, there are six such elements 6.

Two large cutouts 8 and 8' extend radially on either side of each element, the cutouts being made in the material constituting the tray. The cutout 8' extends between the element 6 and the above-described low wall 50.

As explained below, these "gaps" in the material contribute to improving elastic deformation of the elements 6.

In the rest position as shown in FIG. 5, i.e. when there is no disk on the tray 10, the outer side face 60 of each element 6 extends perpendicularly to the plane of the tray. The top portion 62 thereof is enlarged so as to constitute a protuberance that overhangs from said wall 60. This gives the element a hook shape. This top portion has an entry chamfer 63 for a purpose that is explained below. The inner wall 61 of the element 6 is chamfered so as to give greater thickness to the base of the element than to its top.

Because the elements 6 are narrow and because they are disposed between two large cutouts 8 and 8' they can deform elastically with movement that is essentially radial.

The distance $d_1$ (see FIG. 5) between the enlarged portions 62 of the two diametrically opposite elements 6 is slightly greater than the diameter of the central opening of a disk. However, the distance between these elements 6 where their bases meet the tray 10 is slightly less than the diameter of said opening.

In a particular embodiment that is not shown, only every other element 6 has an enlarged top portion giving a total of three out of six elements with such a portion. Under such circumstances, these elements are disposed in alternating manner. Preferably, an element 6 having an enlarged portion faces, on the other side of the tray, an element which does not have one, and vice versa.

In yet another variant, the elements can be constituted by sloping fingers having two side faces that are parallel.

FIGS. 7 to 9 show a disk 9 being put into place on one side of the tray 10. Clearly the same procedure is used on the other side of the tray given that it has a hub that is identical.

With reference to FIG. 7, the disk 9 is shown in part with its central opening 90 and with reference 91 designating the edge of said opening.

In order to put the disk into place on the tray, the disk is placed so that its opening 90 overlies the elements 5 and 6 of the hub. A force F is then applied axially, i.e. perpendicularly to the plane of the tray 10.

During this movement, the edge 91 of the opening in the disk comes into contact with the flexible elements 6. This edge slides over the chamfers 63 so that the elements 6 tend to retract slightly by pivoting towards the center of the tray. As a result it is possible to engage the disk until it comes into contact with the tray 10. The elements 6 then return to their initial positions. This is the configuration shown in FIG. 8.

In this state, the enlarged portion 62 on each flexible element 6 prevents the disk from being removed in the axial direction. Nevertheless, in this position, the edge 91 of the opening of the disk is not in contact with the elements 6. The elements 6 are set back from the disk.

It is the elements 5 via the arcuate crossbar 52 of each T-shaped element that provide contact with the edge 91. Consequently, in the event of a tray 10 carrying one or two disks being dropped accidentally, it is these rigid an massive elements 5 which take the shock and which do so without breaking.

The flexible and therefore fragile elements 6 are not damaged in any way.

As an indication, the diameter of the central opening of a disk is 15 millimeters (mm) while the distance $d_2$ is 14.98 mm. The distance $d_1$ is equal to 15.26 mm and the distance extending diametrically between the bases of two elements 6 is equal to 14.33 mm.

In an embodiment that is not shown, the tray of the invention can form an integral part of the bottom portion of a case that also has a lid.

The dual hub as shown in the embodiment of FIGS. 10 and 11 has the same general structure as that of the preceding figures.

Thus, as already described, the rigid element 5 has respective radial tabs 51.

However the dual hub differs by the following characteristics.

Each radial tab 51 is connected to an arcuate crossbar 52. Each crossbar is common to two adjacent tabs. Thus, on a single face of the tray having six radial tabs, there are only three crossbars.

In addition, where one face of the tray has a crossbar 52, its opposite face does not have one. The elements 5 are thus disposed in alternating manner from one face to the other.

The central portions of the crossbars 52 constitute the separation zone between the pairs of cutouts 8 and From its face situated in the plane of the tray, each crossbar 52 has a flexible element 6 projecting therefrom.

Thus, on each face of the tray there are three rigid elements 5 and three flexible elements 6 disposed in alternating manner, a rigid element on one face facing a flexible element on the other face, and vice versa.

What is claimed is:

1. A tray for receiving at least one circular data storage disk (9) having a central opening (90), the tray having wall elements (5; 6) in its center that are inscribed within a circle and designed to penetrate into the central opening (90) of the disk (9) in order to retain the disk, the tray being characterized by the fact that said wall elements comprise rigid elements (5) suitable for bearing against the edge (91) of the central opening (90) of the disk (9), and flexible elements (6) in the form of elastically deformable fingers suitable for opposing removal of the disk (9) in an axial direction, without bearing against the edge (91) of its central opening (90).

2. A tray according to claim 1, characterized by the fact that each of said rigid elements (5) comprises a radial branch (51) and an arcuate crossbar (52) suitable for bearing against the edge (91) of the central opening (90) of the disk (9).

3. A tray according to claim 1, characterized by the fact that said flexible elements (6) present respective enlarged top portions (62) giving them a generally hooked shape.

4. A tray according to claim 3, characterized by the fact that the top portion (62) is chamfered so as to facilitate retraction of said elements (6) by elastic deformation while the disk (9) is being engaged.

5. A tray according to claim 1, characterized by the fact that said rigid elements and said flexible elements (5, 6) are distributed in alternating manner.

6. A tray according to claim 1, characterized by the fact that it has wall elements (5; 6) on both faces so as to suitable for receiving two disks (9).

7. A tray according to claim 6, characterized by the fact that the wall elements (5; 6) on one face extend the wall elements on the other face.

8. A tray according to claim 7, characterized by the fact that the wall elements (5; 6) on one face are distributed in alternating manner relative to the elements of the other face.

9. A tray according to claim 2, characterized by the fact that the arcuate crossbars (52) of two adjacent rigid elements (5) meet and carry a flexible element (6) which projects towards the second face through an opening (8, 8').

10. A tray according to claim 1, characterized by the fact that it is provided with a support strip (11) to which it is hinged via at least one hinge (3), said hinge (3) being constituted solely by the free intermediate zone of a flexible sheet (4) overmolded on said tray (10) and said strip (11).

11. A case for storing a circular data storage disk (9) having a central opening, the case comprising a bottom and a lid that are hinged to each other by a hinge, and being characterized by the fact that it includes a tray according to claim 1 which coincides with said bottom.

* * * * *